US012687524B2

(12) United States Patent
Gayle

(10) Patent No.: US 12,687,524 B2
(45) Date of Patent: Jul. 21, 2026

(54) SYSTEMS AND METHODS FOR ASSESSING OPERATIONAL INTEGRITY OF ULTRASONIC TRANSDUCERS

(71) Applicant: THE BOEING COMPANY, Arlington, VA (US)

(72) Inventor: David Michael Gayle, Summerville, SC (US)

(73) Assignee: The Boeing Company, Arlington, VA (US)

( * ) Notice: Subject to any disclaimer, the term of this patent is extended or adjusted under 35 U.S.C. 154(b) by 329 days.

(21) Appl. No.: 18/595,495

(22) Filed: Mar. 5, 2024

(65) Prior Publication Data

US 2025/0283856 A1 Sep. 11, 2025

(51) Int. Cl.
*G01N 29/30* (2006.01)
*G01N 29/06* (2006.01)

(52) U.S. Cl.
CPC ......... *G01N 29/30* (2013.01); *G01N 29/0609* (2013.01); *G01N 2291/02854* (2013.01); *G01N 2291/101* (2013.01)

(58) Field of Classification Search
CPC .............. G01N 29/30; G01N 29/0609; G01N 2291/02854; G01N 2291/101
USPC ......................................................... 73/1.82
See application file for complete search history.

(56) References Cited

U.S. PATENT DOCUMENTS

| | | | | |
|---|---|---|---|---|
| 5,159,838 A | * | 11/1992 | Lynnworth | B06B 3/00 |
| | | | | 73/644 |
| 6,344,656 B1 | * | 2/2002 | Hopkins | G01B 11/005 |
| | | | | 250/559.22 |
| 9,664,651 B2 | * | 5/2017 | Oberdoerfer | G01N 29/069 |
| 2004/0122315 A1 | * | 6/2004 | Krill | A61B 1/041 |
| | | | | 600/549 |
| 2009/0043198 A1 | * | 2/2009 | Milner | A61B 8/0816 |
| | | | | 600/437 |
| 2014/0171788 A1 | * | 6/2014 | Stigall | A61B 8/12 |
| | | | | 600/453 |
| 2023/0043371 A1 | * | 2/2023 | Dhatt | A61B 8/4444 |

OTHER PUBLICATIONS

Gayle and Donar, "Characterization of Linear Arrays for Composite Inspection," from Materials Evaluation, vol. 20, No. 6, pp. 631-637 (2012).

* cited by examiner

*Primary Examiner* — Peter J Macchiarolo
*Assistant Examiner* — Rodney T Frank
(74) *Attorney, Agent, or Firm* — Joseph M. Butscher; Carroll, Hoette & butscher, LLC

(57) ABSTRACT

A system for assessing operational integrity of an ultrasonic transducer includes a metrological tool including a rod having test holes. The ultrasonic transducer is configured to be coupled to the metrological tool and emit ultrasonic energy into the rod. A method for assessing operational integrity of an ultrasonic transducer includes coupling the ultrasonic transducer to a metrological tool including a rod having test holes, and emitting, by the ultrasonic transducer, ultrasonic energy into the rod.

18 Claims, 4 Drawing Sheets

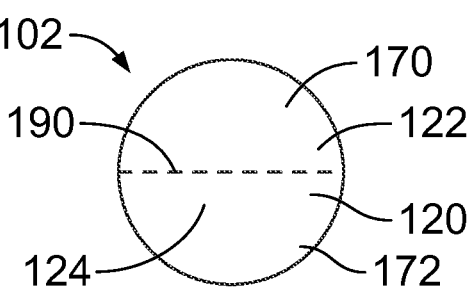
FIG. 4
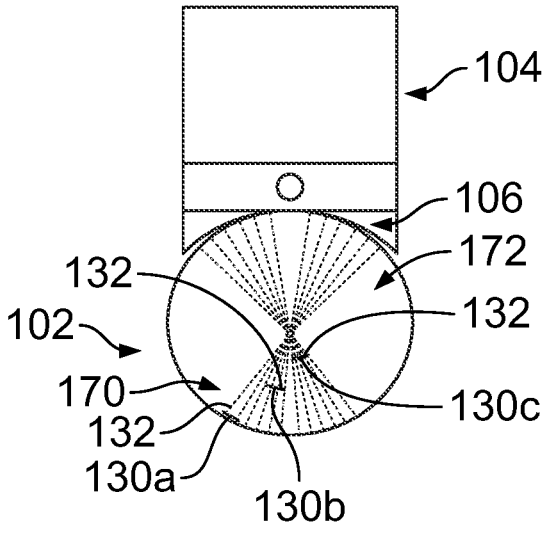
FIG. 5
FIG. 6

Rt- Transducer element radius
r- Inner surface radius of curvature (inches)
d- Maximum depth below the inner surface (inches)

RCF = (r+d)/Rt

SYSTEMS AND METHODS FOR ASSESSING OPERATIONAL INTEGRITY OF ULTRASONIC TRANSDUCERS

FIELD OF THE DISCLOSURE

Examples of the present disclosure generally relate to systems and methods for assessing and verifying operational integrity of ultrasonic transducers, such as can be used to non-destructively inspect various structural components of an aircraft.

BACKGROUND OF THE DISCLOSURE

Ultrasonic transducers can be used to inspect various structural components. For example, during a manufacturing process of a commercial aircraft, ultrasonic transducers can be used to non-destructively inspect various structures, such as stringers, spars, frames, and the like of various portions of the aircraft.

Typically, ultrasonic transducers having ultrasonic linear arrays are custom manufactured for non-destructive inspection of particular components. Performance of an ultrasonic transducer varies based on a particular component being inspected.

In general, operational performance of an ultrasonic transducer used for non-destructive inspection is unknown until the ultrasonic transducer is actually used during an inspection process. However, the unknown condition can impact production by creating delays in system qualification.

SUMMARY OF THE DISCLOSURE

A need exists for a system and a method for verifying operational integrity of an ultrasonic transducer, such as used for non-destructive inspection, before being shipped to an end user. Because ultrasonic transducers used for non-destructive inspection are typically custom manufactured, there can be a long lead time before delivery to an end user. As such, there is a need to verify operational verification of the ultrasonic transducer.

With those needs in mind, certain examples of the present disclosure provide a system for assessing operational integrity of an ultrasonic transducer. The system includes a metrological tool including a rod having test holes. The ultrasonic transducer is configured to be coupled to the metrological tool and emit ultrasonic energy into the rod.

In at least one example, a control unit is in communication with the ultrasonic transducer. The control unit is configured to generate a sonogram of the metrological tool based on signals received from the ultrasonic transducer.

In at least one example, a user interface is in communication with the control unit. The user interface includes a display. The control unit is configured to show information regarding the ultrasonic transducer on the display.

In at least one example, the rod is formed of acrylic. Optionally, the rod can be formed of metal, or another homogenous material.

Each of the test holes includes a flat bottom. Two or more of the test holes can differ in depth. Two or more of the test holes can differ in diameter. Two or more of the test holes can be spaced apart from one another by an arc length.

In at least one example, the rod includes a first axial half and a second axial half. The test holes are formed in the first axial half. The second axial half is devoid of the test holes.

In at least one example, a diameter of the rod is two times a radius of a linear array of the ultrasonic transducer having a radius correction factor less than 1. In at least one example, a diameter of the rod is four times a radius of a linear array of the ultrasonic transducer having a radius correction factor of 1 or greater than 1.

The rod can include a pocket configured to receive and radially constrain an end of the ultrasonic transducer.

Certain examples of the present disclosure provide a method for assessing operational integrity of an ultrasonic transducer, the method including coupling the ultrasonic transducer to a metrological tool including a rod having test holes; and emitting, by the ultrasonic transducer, ultrasonic energy into the rod.

BRIEF DESCRIPTION OF THE DRAWINGS

FIG. 4 illustrates an end view of the metrological tool of FIG. 2.

FIG. 5 illustrates a cross-sectional view of an ultrasonic transducer having a radius correction factor less than 1 disposed on a metrological tool through line 5-5 of FIG. 3, according to an example of the present disclosure.

FIG. 6 illustrates a cross-sectional view of an ultrasonic transducer having a radius correction factor of 1 of greater than 1 disposed on a metrological tool through line 5-5 of FIG. 3, according to an example of the present disclosure

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
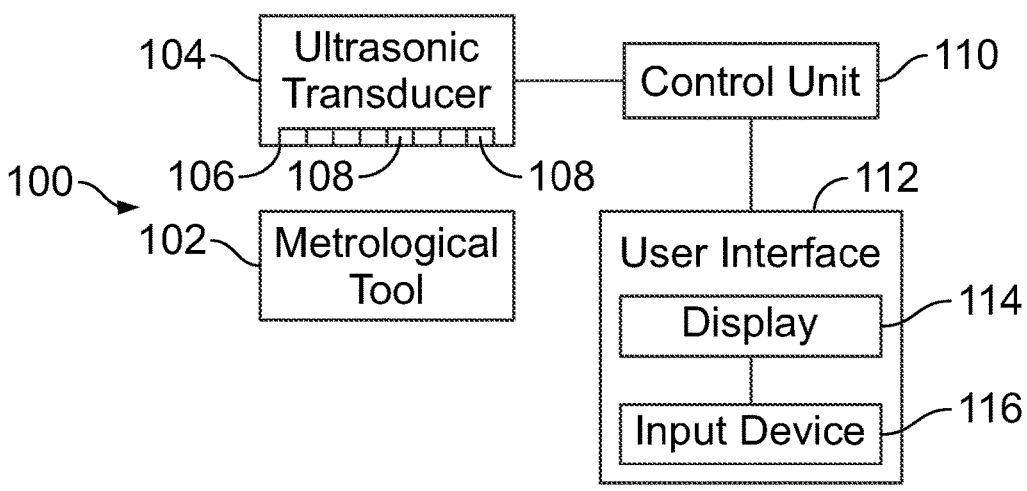
FIG. 1 illustrates a block diagram of a system, according to an example of the present disclosure.

FIG. 1 illustrates a block diagram of a system 100, according to an example of the present disclosure. The system 100 includes a metrological tool 102 configured to assess operational integrity of an ultrasonic transducer 104, which can be used to non-destructively inspect structural components. In at least one example, the ultrasonic transducer 104 includes a linear array 106 of ultrasonic elements 108 configured to emit ultrasonic energy.

The ultrasonic transducer 104 is in communication with a control unit 110, such as through one or more wired or wireless connections. In at least one example, the control unit 110 is separate and distinct from the ultrasonic transducer 104. For example, the control unit 110 can be part of a computer workstation, a handheld tool (such as a smart tablet or smart phone), or the like. As another example, the ultrasonic transducer 104 can include the control unit 110.

The control unit 110 is in communication with a user interface 112, such as through one or more wired or wireless connections. In at least one example, the user interface 112 includes a display 114 and an input tool 116. In at least one example, the display 114 is an electronic device configured to electronically show images, videos, text, and/or the like. The display 114 can be a monitor, screen, television, touchscreen, and/or the like. The input tool 116 can include a keyboard, mouse, stylus, touchscreen interface (that is, the input tool 116 can be integral with the display 114), and/or the like. The user interface 112 can be, or part of, a computer workstation, a handheld tool, or the like. The control unit 110 and the user interface 112 can be part of a common sub-system, such as a computer workstation, a handheld tool, or the like. As another example, the user interface 112 can be separate and distinct from the control unit 110.

The control unit 110 includes or is in communication with a memory that stores data regarding the metrological tool 102. For example, the memory stores a sonogram detailing the structural features of the metrological tool 102.

In operation, the ultrasonic transducer 104 is operated to emit ultrasonic energy into the metrological tool 102. For example, the ultrasonic elements 108 of the linear array 106 emit ultrasonic energy into the metrological tool 102. The ultrasonic energy reflects back from internal structural features of the metrological tool 102. The control unit 110 receives signals regarding the emitted ultrasonic energy and reflected ultrasonic energy from the ultrasonic transducer 104 and forms a sonogram of the metrological tool 102 from the signals. The control unit 110 compares the resulting sonogram with the stored data regarding the metrological tool 102. If the resulting sonogram conforms to (for example, is the same) as the stored data regarding the metrological tool 102, the control unit 110 verifies the operational integrity of the ultrasonic transducer 104. Conversely, if the resulting sonogram differs from the stored data, the control unit 110 determines that the ultrasonic transducer 104 has a fault.

In at least one example, the control unit 110 can show the resulting sonogram on the display 114 of the user interface 112. The control unit 110 can show the resulting sonogram and the stored data of the metrological tool 102 (such as a specification sonogram) on the display 114. The control unit 110 can also output signals to the user interface 112 regarding the determined assessment of the ultrasonic transducer 104 on the display 114, such as text and/or a graphic indicating verification of the operational integrity of the ultrasonic transducer 104, or an alert indicating a fault with the ultrasonic transducer 104.

Figure 2:
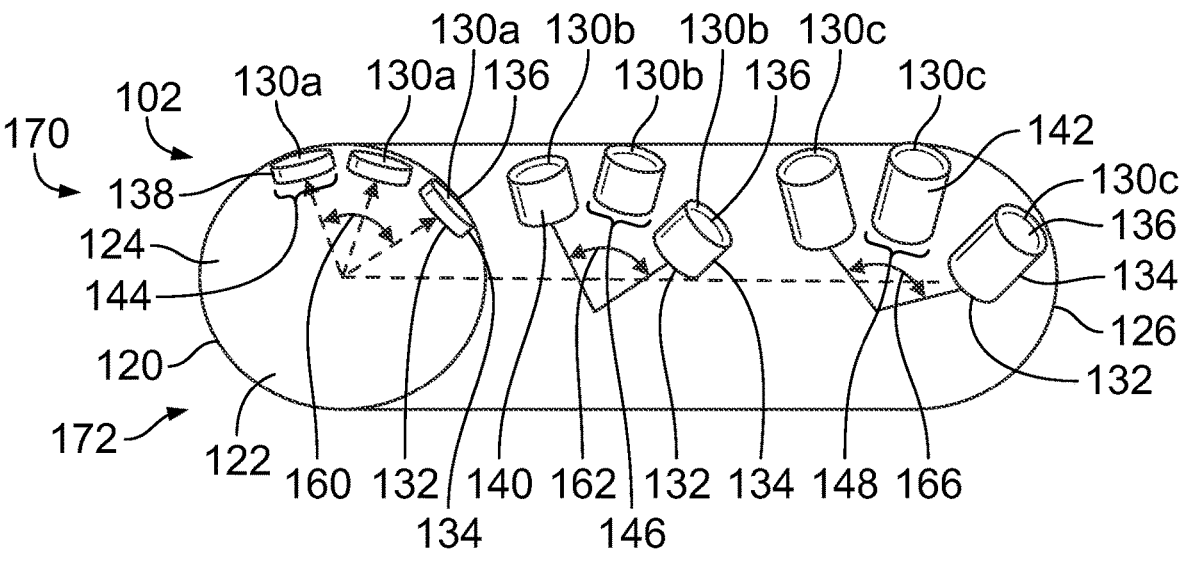
FIG. 2 illustrates an isometric view of a metrological tool, according to an example of the present disclosure.

FIG. 2 illustrates an isometric view of the metrological tool 102, according to an example of the present disclosure. The metrological tool 102 includes a main body 120 shaped as rod 122, such as a cylindrical rod. In at least one example, the rod 122 includes a circular cross-section. The rod 122 extends between a first end 124 and a second end 126 opposite from the first end 124. In at least one example, the rod 122 is formed of acrylic. In particular, rod 122 is a solid piece of acrylic. In at least one other example, the rod 122 is formed of a metal, or another homogenous material.

Test holes 130a, 130b, and 130c are formed in the rod 122. The test holes 130a, 130b, and 130c are machined into the rod 122. Each test hole 130a, 130b, and 130c includes a flat bottom 132 disposed into the rod 122. The flat bottom 132 connects to interior walls 134 that connect to an opening 136.

The test holes 130a have a first depth 138 that differs from a second depth 140 of the test holes 130b, which, in turn, differs from a third depth 142 of the test holes 130c. The first depth 138 is less than the second depth 140, which is less than the third depth 142. Each of the test holes 130a can have the same first depth 138. Optionally, depths of at least two of the test holes 130a can be different. Similarly, each of the test holes 130b can have the same second depth 140. Optionally, depths of at least two of the test holes 130b can be different. Also, similarly, each of the test holes 130c can have the same third depth 142. Optionally, depths of at least two of the test holes 130c can be different.

The test holes 130a have a diameter 144 that can be the same or different from a diameter 146 of the test holes 130b, and the same or different from a diameter 148 of the test holes 130c. Each of the test holes 130a can have the same diameter 144. Optionally, diameters of at least two of the test holes 130a can differ. Similarly, each of the test holes 130b can have the same diameter 146. Optionally, diameters of at least two of the test holes 130b can differ. Also, similarly, each of the test holes 130c can have the same diameter 148. Optionally, diameters of at least two of the test holes 130c can differ.

The test holes 130a have centers along an arc 160, such as between 15-180 degrees. Each of the test holes 130a is separated by a defined arc length. The test holes 130a are at different arcuate positions. The arc length between neighboring (that is, closest) test holes 130a can be the same, or different. Similarly, the test holes 130b have centers along an arc 162, such as between 15-180 degrees. Each of the test holes 130b is separated by a defined arc length. The test holes 130b are at different arcuate positions. The arc length between neighboring (that is, closest) test holes 130b can be the same, or different. Also, similarly, the test holes 130c have centers along an arc 166, such as between 15-180 degrees. Each of the test holes 130c is separated by a defined arc length. The test holes 130c are at different arcuate positions. The arc length between neighboring (that is, closest) test holes 130c can be the same, or different.

In at least one example, the test holes 130a are at a first axial position along a length of the rod 122, while the test holes 130b are at a second axial position along the length of the rod 122, and the test holes 130c are at a third axial position along the length of the rod 122. The first, second, and third axial positions differ from one another. Optionally, one or more of the test holes 130a, 130b, and 130c can be at a common axial position along the length of the rod.

As shown, the test holes 130a, 130b, and 130c are formed in a portion of the rod 122. In particular, the test holes 130a, 130b, and 130c are formed within an arc length of 180 degrees or less. The test holes 130a, 130b, and 130c are formed in a first portion 170, such as a first axial half, of the rod 122, but not a second portion 172, such as a second axial half of the rod 122. The second portion 172 is devoid of the test holes 130a, 130b, and 130c. Referring to FIGS. 1 and 2, during an assessment process, the ultrasonic transducer 104 is disposed on the second portion 172 so that ultrasonic energy is transmitted through the rod 122 and onto and/or into the test holes 130a-130c, and ultrasonic energy is reflected back through the rod 122 without having any holes interfere with the reflected ultrasonic energy.

As shown, the metrological tool 102 includes three test holes 130a, three test holes 130b, and three test holes 130c.

Optionally, the metrological tool 102 can include more or fewer test holes 130*a*, 130*b*, and 130*c* than shown. Further, the test holes 130*a*, 130*b*, and 130*c* can extend over arcs that are greater or less than shown. Also, optionally, the metrological tool 102 can include only the test holes 130*a*, 130*b*, or 130*c*. As another example, the metrological tool 102 can include the test holes 130*a* and 130*b*, but not the test holes 130*c*. As another example, the metrological tool 102 can include the test holes 130*b* and 130*c*, but not the test holes 130*a*. As another example, the metrological tool 102 can include the test holes 130*a* and 130*c*, but not the test holes 130*b*. As another example, the metrological tool 102 can include test holes in addition to the test holes 130*a*-130*c*.

The test holes 130*a*-130*c* provide structural features within the metrological tool that can be mapped and stored as part of a specification sonogram stored within a memory. The control unit 110 compares the specification sonogram with a sonogram formed in response to the ultrasonic transducer 104 emitting the ultrasonic energy into the metrological tool 102.

Referring to FIGS. 1 and 2, the system 100 is for assessing operational integrity of the ultrasonic transducer 104. The system 100 includes the metrological tool 102 including the rod 122 having a plurality of test holes 130*a*-*c* formed in the rod 122. The ultrasonic transducer 104 is configured to be coupled to (such as by abutting into) the metrological tool 102 and emit ultrasonic energy into the rod 122. The ultrasonic energy is reflected off the test holes 130*a*-*c*, which is then used to provide a sonogram of the metrological tool 102. The sonogram can then be compared to structural data of the metrological tool 102 to assess the operational integrity of the ultrasonic transducer 104. The control unit 110 is in communication with the ultrasonic transducer 104, and is configured to generate the sonogram of the metrological tool 102 based on signals received from the ultrasonic transducer 104.

Figure 3:
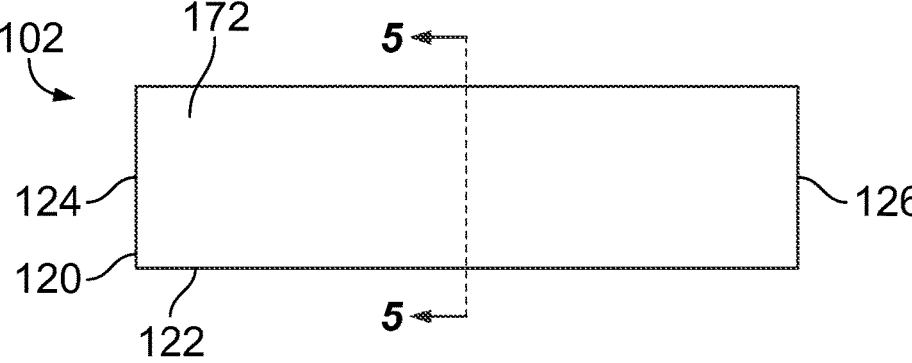
FIG. 3 illustrates a bottom view of the metrological tool of FIG. 2.

FIG. 3 illustrates a bottom view of the metrological tool 102 of FIG. 2. FIG. 4 illustrates an end view of the metrological tool of FIG. 2. Referring to FIGS. 1-4, in at least one example, the second portion 172 of the rod 122 is a bottom half. Optionally, the second portion 172 can be a top half.

As described herein, the metrological tool 102 is configured to verify operational integrity (such as array performance, depth of inspection, and coverage) of the ultrasonic transducer 104, which is configured for non-destructive inspection. The metrological tool 102 includes the rod 122, formed of acrylic. A series of flat-bottomed test holes 130*a*-*c* are drilled at a known diameter, depth, and clocking. During an assessment process, the ultrasonic transducer 104 emits ultrasonic energy into the metrological tool 102, and a reflected signal is analyzed by the control unit 110 in relation to stored data regarding the metrological tool 102 to determine the operational integrity of the ultrasonic transducer 104.

Figure 10:
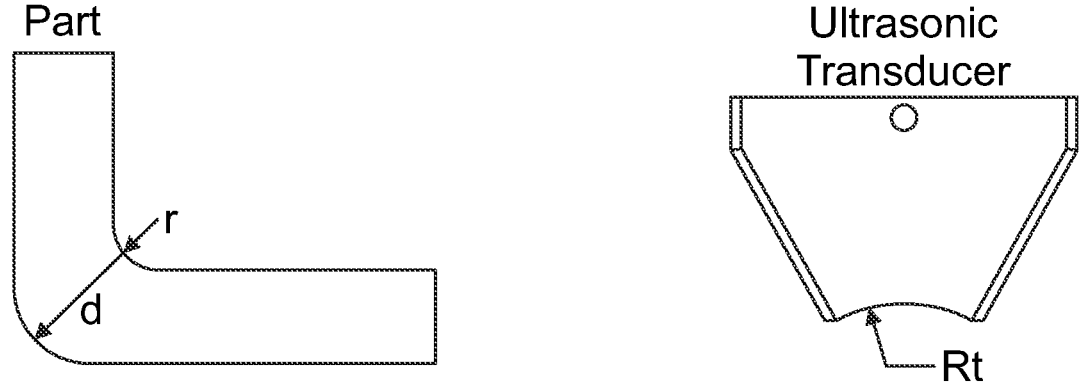
FIG. 10 illustrates a radius correction factor as applied to an ultrasonic transducer and part.

In at least one example, the control unit 110 compares the reflected signal (for example, the reflected ultrasonic energy) to a theoretical signal (such as stored in memory) to verify performance of the ultrasonic transducer 104. A diameter 190 of the rod 122 is selected according to a radius correction factor (RCF), and flat bottom test holes are drilled at depths to validate near and far surface detectability. The flat bottom test holes are clocked at various depths in order to prove array coverage of synthetic flaws (that is, the test holes. As shown in FIG. 10, the RCF is determined as follows:

$$RCF = (r+d)/Rt$$

Where Rt is a transducer array radius, r is an inner surface radius of curvature of a part to be inspected by the ultrasonic transducer, and d is a maximum depth below an inner surface of the part. In at least one example, for ultrasonic transducers 104 having a an RCF less than 1, a diameter 190 of the rod 122 is two times a radius of the linear array 106. In at least one example, for ultrasonic transducers 104 having an RCF greater than 1, the diameter 180 of the rod 122 is four times the radius of the linear array 106.

Examples of the present disclosure provide systems and methods for validating the ultrasonic transducer 104 well before qualification, and do not require a production part for metrology testing. Further, the metrological tool 102 can also be used during non-destructive inspection system development, which can accelerate aperture selection and procedures. The metrological tool 102 can also lead to standardization of array performance, and thereby be used by several suppliers.

FIG. 5 illustrates a cross-sectional view of an ultrasonic transducer 104 having a radius correction factor less than 1 disposed on a metrological tool 102 through line 5-5 of FIG. 3, according to an example of the present disclosure. As shown, the test holes 130*a*, 130*b*, and 130*c* can have centers along a common cross-sectional arc length. The tests holes 130*a*, 130*b*, and 130*c* have flat bottoms 132 at different depths. The example shown in FIG. 5 can be used with respect to an RCF of 1 or less.

FIG. 6 illustrates a cross-sectional view of an ultrasonic transducer 103 having a radius correction factor of 1 or greater than 1 disposed on a metrological tool 102 through line 5-5 of FIG. 3, according to an example of the present disclosure. In this example, a pocket 194 can be formed in the rod 122. The pocket 194 can extend along a length of the rod 122. The pocket 194 conforms to a size and a shape of an end 196 of the ultrasonic transducer 104. The end 196 includes the linear array 106 of ultrasonic elements 108 (shown in FIG. 1). The pocket 194 is configured to receive and radially constrain the end 196 to allow for a centerline of the linear array 106 to match a centerline 198 of the rod 122. The example shown in FIG. 6 can be used with respect to an RCF between 1 and 2.

Figure 7:
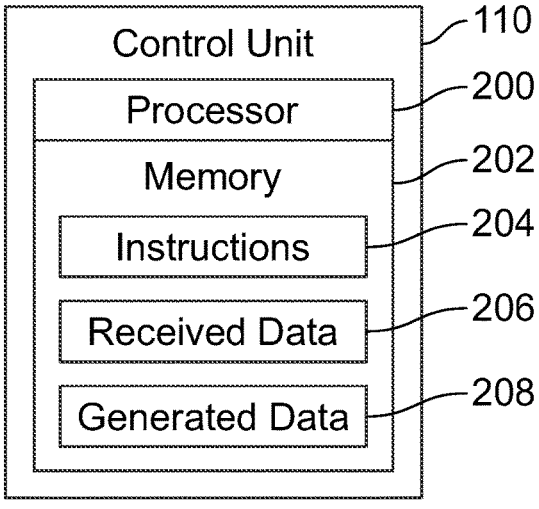
FIG. 7 illustrates a schematic block diagram of a control unit, according to an example of the present disclosure.

FIG. 7 illustrates a schematic block diagram of the control unit 110, according to an example of the present disclosure. In at least one example, the control unit 110 includes at least one processor 200 in communication with a memory 202. The memory 202 stores instructions 204, received data 206, and generated data 208. The control unit 110 shown in FIG. 7 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 110 may be or include one or more processors that are configured to control operation, as described herein.

The control unit 110 is configured to execute a set of instructions that are stored in one or more data storage units or elements (such as one or more memories), in order to process data. For example, the control unit 110 may include or be coupled to one or more memories. The data storage units may also store data or other information as desired or needed. The data storage units may be in the form of an information source or a physical memory element within a processing machine.

The set of instructions may include various commands that instruct the control unit 110 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 110. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based tools, such as microprocessors, processors, controllers, or the like. Optionally, the control unit 110 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 8:
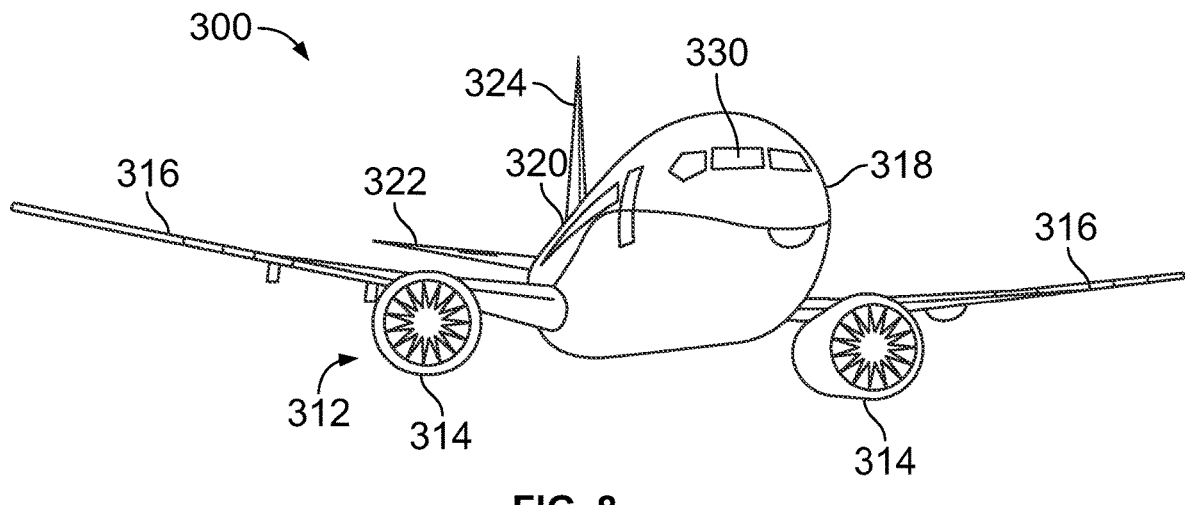
FIG. 8 illustrates a perspective front view of an aircraft, according to an example of the present disclosure.

FIG. 8 illustrates a perspective front view of an aircraft 300, according to an example of the present disclosure. The aircraft 300 includes a propulsion system 312 that includes engines 314, for example. Optionally, the propulsion system 312 may include more engines 314 than shown. The engines 314 are carried by wings 316 of the aircraft 300. In other examples, the engines 314 may be carried by a fuselage 318 and/or an empennage 320. The empennage 320 may also support horizontal stabilizers 322 and a vertical stabilizer 324. The fuselage 318 of the aircraft 300 defines an internal cabin 330, which includes a flight deck or cockpit, one or more work sections (for example, galleys, personnel carry-on baggage areas, and the like), one or more passenger sections (for example, first class, business class, and coach sections), one or more lavatories, and/or the like. FIG. 8 shows an example of an aircraft 300. It is to be understood that the aircraft 300 can be sized, shaped, and configured differently than shown in FIG. 8.

Figure 9:
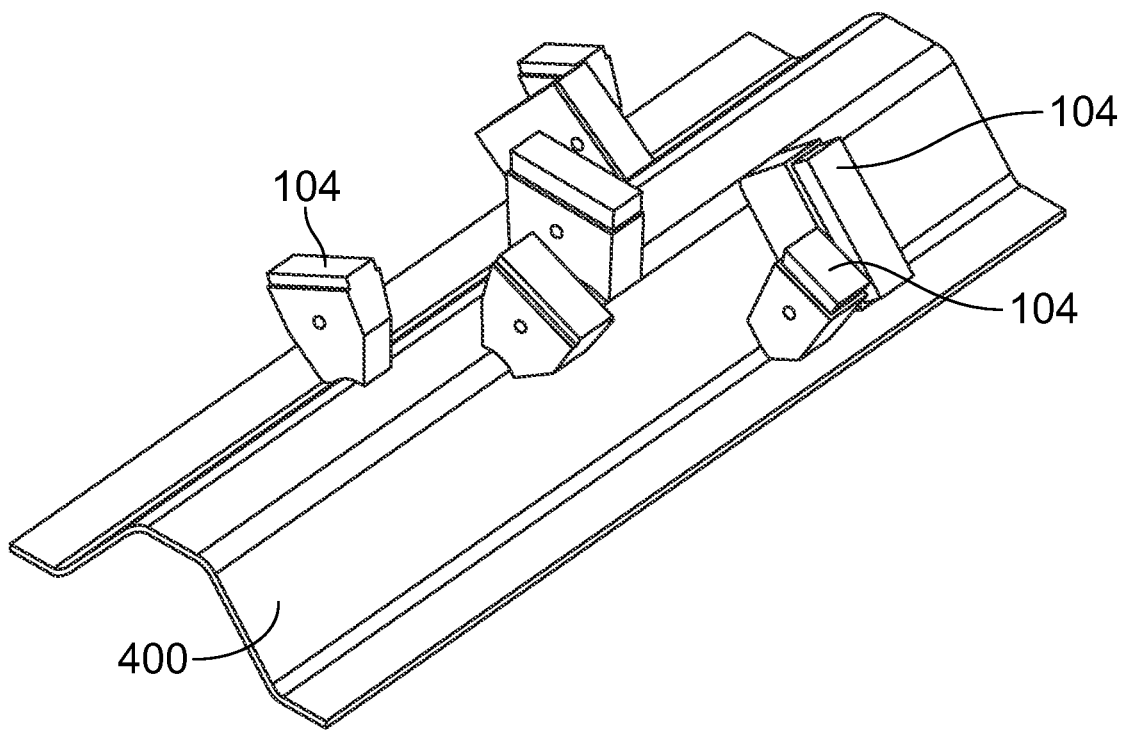
FIG. 9 illustrates a perspective top view of ultrasonic transducers disposed on a structure, according to an example of the present disclosure.

FIG. 9 illustrates a perspective top view of ultrasonic transducers 104 disposed on a structure 400, according to an example of the present disclosure. The structure 400 can be a portion of an aircraft, such as the aircraft 300 shown in FIG. 8. For example, the structure 400 can be a stringer. The ultrasonic transducers 104 are coupled to the structure 400 and operated to perform non-destructive inspection of the structure 400. Before the ultrasonic transducers 104 are coupled to the structure 400, the ultrasonic transducers 104 can be assessed by the system 100 including the metrological tool 102, as shown and described with respect to FIGS. 1-7.

Further, the disclosure comprises examples according to the following clauses:

Clause 1. A system for assessing operational integrity of an ultrasonic transducer, the system comprising:
 a metrological tool including a rod having test holes, wherein the ultrasonic transducer is configured to be coupled to the metrological tool and emit ultrasonic energy into the rod.

Clause 2. The system of Clause 1, further comprising a control unit in communication with the ultrasonic transducer, wherein the control unit is configured to generate a sonogram of the metrological tool based on signals received from the ultrasonic transducer.

Clause 3. The system of Clause 2, further comprising a user interface in communication with the control unit, wherein the user interface comprises a display, and wherein the control unit is configured to show information regarding the ultrasonic transducer on the display.

Clause 4. The system of any of Clauses 1-3, wherein the rod is formed of acrylic.

Clause 5. The system of any of Clauses 1-4, wherein each of the test holes includes a flat bottom.

Clause 6. The system of any of Clauses 1-5, wherein two or more of the test holes differ in depth.

Clause 7. The system of any of Clauses 1-6, wherein two or more of the test holes differ in diameter.

Clause 8. The system of any of Clauses 1-7, wherein two or more of the test holes are spaced apart from one another by an arc length.

Clause 9. The system of any of Clauses 1-8, wherein the rod comprises a first axial half and a second axial half, wherein the test holes are formed in the first axial half, and wherein the second axial half is devoid of the test holes.

Clause 10. The system of any of Clauses 1-9, wherein a diameter of the rod is two times a radius of a linear array of the ultrasonic transducer having a radius correction factor less than 1.

Clause 11. The system of any of Clauses 1-10, wherein a diameter of the rod is four times a radius of a linear array of the ultrasonic transducer having a radius correction factor greater than 1.

Clause 12. The system of any of Clauses 1-11, wherein the rod comprises a pocket configured to receive and radially constrain an end of the ultrasonic transducer.

Clause 13. A method for assessing operational integrity of an ultrasonic transducer, the method comprising:
 coupling the ultrasonic transducer to a metrological tool including a rod having test holes; and
 emitting, by the ultrasonic transducer, ultrasonic energy into the rod.

Clause 14. The method of Clause 13, further comprising:
 generating, by a control unit in communication with the ultrasonic transducer, a sonogram of the metrological tool based on signals received from the ultrasonic transducer; and showing, by the control unit on a display of a user interface, information regarding the ultrasonic transducer on the display.

Clause 15. The method of Clauses 13 or 14, wherein the rod is formed of acrylic, and wherein each of the test holes includes a flat bottom.

Clause 16. The method of any of Clauses 13-15, wherein two or more of the test holes differ in depth, wherein two or more of the test holes differ in diameter, and wherein two or more of the test holes are spaced apart from one another by an arc length, wherein the rod comprises a first axial half and a second axial half, wherein the test holes are formed in the first axial half, and wherein the second axial half is devoid of the test holes.

Clause 17. The method of any of Clauses 13-16, wherein a diameter of the rod is two times a radius of a linear array of the ultrasonic transducer having a radius correction factor less than 1.

Clause 18. The method of any of Clauses 13-17, wherein a diameter of the rod is four times a radius of a linear array of the ultrasonic transducer having a radius correction factor greater than 1.

Clause 19. The method of any of Clauses 13-18, further comprising receiving and radially constraining an end of the ultrasonic transducer within a pocket formed in the rod.

Clause 20. A system for assessing operational integrity of an ultrasonic transducer, the system comprising:

a metrological tool including an acrylic rod having test holes, wherein the ultrasonic transducer is configured to be coupled to the metrological tool and emit ultrasonic energy into the acrylic rod, wherein each of the test holes includes a flat bottom, wherein two or more of the test holes differ in depth, wherein two or more of the test holes differ in diameter, and wherein two or more of the test holes are spaced apart from one another by an arc length, and wherein the acrylic rod comprises a first axial half and a second axial half, wherein the test holes are formed in the first axial half, and wherein the second axial half is devoid of the test holes;

a control unit in communication with the ultrasonic transducer, wherein the control unit is configured to generate a sonogram of the metrological tool based on signals received from the ultrasonic transducer; and a user interface in communication with the control unit, wherein the user interface comprises a display, and wherein the control unit is configured to show information regarding the ultrasonic transducer on the display.

As described herein, examples of the present disclosure provide systems and methods for verifying operational integrity of an ultrasonic transducer, such as used for non-destructive inspection of structural components.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any tools or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for assessing operational integrity of an ultrasonic transducer, the system comprising: a metrological tool including a rod having test holes, wherein the ultrasonic transducer is configured to be coupled to the metrological tool and emit ultrasonic energy into the rod, and a control unit in communication with the ultrasonic transducer, wherein the control unit is configured to generate a sonogram of the metrological tool based on signals received from the ultrasonic transducer.

2. The system of claim 1, further comprising a user interface in communication with the control unit, wherein the user interface comprises a display, and wherein the control unit is configured to show information regarding the ultrasonic transducer on the display.

3. The system of claim 1, wherein the rod is formed of acrylic.

4. The system of claim 1, wherein each of the test holes includes a flat bottom.

5. The system of claim 1, wherein two or more of the test holes differ in depth.

6. The system of claim 1, wherein two or more of the test holes differ in diameter.

7. The system of claim 1, wherein two or more of the test holes are spaced apart from one another by an arc length.

8. The system of claim 1, wherein the rod comprises a first axial half and a second axial half, wherein the test holes are formed in the first axial half, and wherein the second axial half is devoid of the test holes.

9. The system of claim 1, wherein a diameter of the rod is two times a radius of a linear array of the ultrasonic transducer having a radius correction factor less than 1.

10. The system of claim 1, wherein a diameter of the rod is four times a radius of a linear array of the ultrasonic transducer having a radius correction factor greater than 1.

11. The system of claim 1, wherein the rod comprises a pocket configured to receive and radially constrain an end of the ultrasonic transducer.

12. A method for assessing operational integrity of an ultrasonic transducer, the method comprising: coupling the ultrasonic transducer to a metrological tool including a rod having test holes; and emitting, by the ultrasonic transducer, ultrasonic energy into the rod; generating, by a control unit in communication with the ultrasonic transducer, a sonogram of the metrological tool based on signals received from the ultrasonic transducer; and showing, by the control unit on a display of a user interface, information regarding the ultrasonic transducer on the display.

13. The method of claim 12, wherein the rod is formed of acrylic, and wherein each of the test holes includes a flat bottom.

14. The method of claim 12, wherein two or more of the test holes differ in depth, wherein two or more of the test holes differ in diameter, and wherein two or more of the test holes are spaced apart from one another by an arc length, wherein the rod comprises a first axial half and a second axial half, wherein the test holes are formed in the first axial half, and wherein the second axial half is devoid of the test holes.

15. The method of claim 12, wherein a diameter of the rod is two times a radius of a linear array of the ultrasonic transducer having a radius correction factor less than 1.

16. The method of claim 12, wherein a diameter of the rod is four times a radius of a linear array of the ultrasonic transducer having a radius correction factor greater than 1.

17. The method of claim 12, further comprising receiving and radially constraining an end of the ultrasonic transducer within a pocket formed in the rod.

18. A system for assessing operational integrity of an ultrasonic transducer, the system comprising:

a metrological tool including an acrylic rod having test holes, wherein the ultrasonic transducer is configured to be coupled to the metrological tool and emit ultrasonic energy into the acrylic rod, wherein each of the test holes includes a flat bottom, wherein two or more of the test holes differ in depth, wherein two or more of the test holes differ in diameter, and wherein two or more of the test holes are spaced apart from one another by an arc length, and wherein the acrylic rod comprises a first axial half and a second axial half, wherein the test holes are formed in the first axial half, and wherein the second axial half is devoid of the test holes;

a control unit in communication with the ultrasonic transducer, wherein the control unit is configured to generate a sonogram of the metrological tool based on signals received from the ultrasonic transducer; and a user interface in communication with the control unit, wherein the user interface comprises a display, and wherein the control unit is configured to show information regarding the ultrasonic transducer on the display.

* * * * *